May 21, 1946.  J. A. PENNER  2,400,780
JACK
Filed July 29, 1944  2 Sheets-Sheet 1
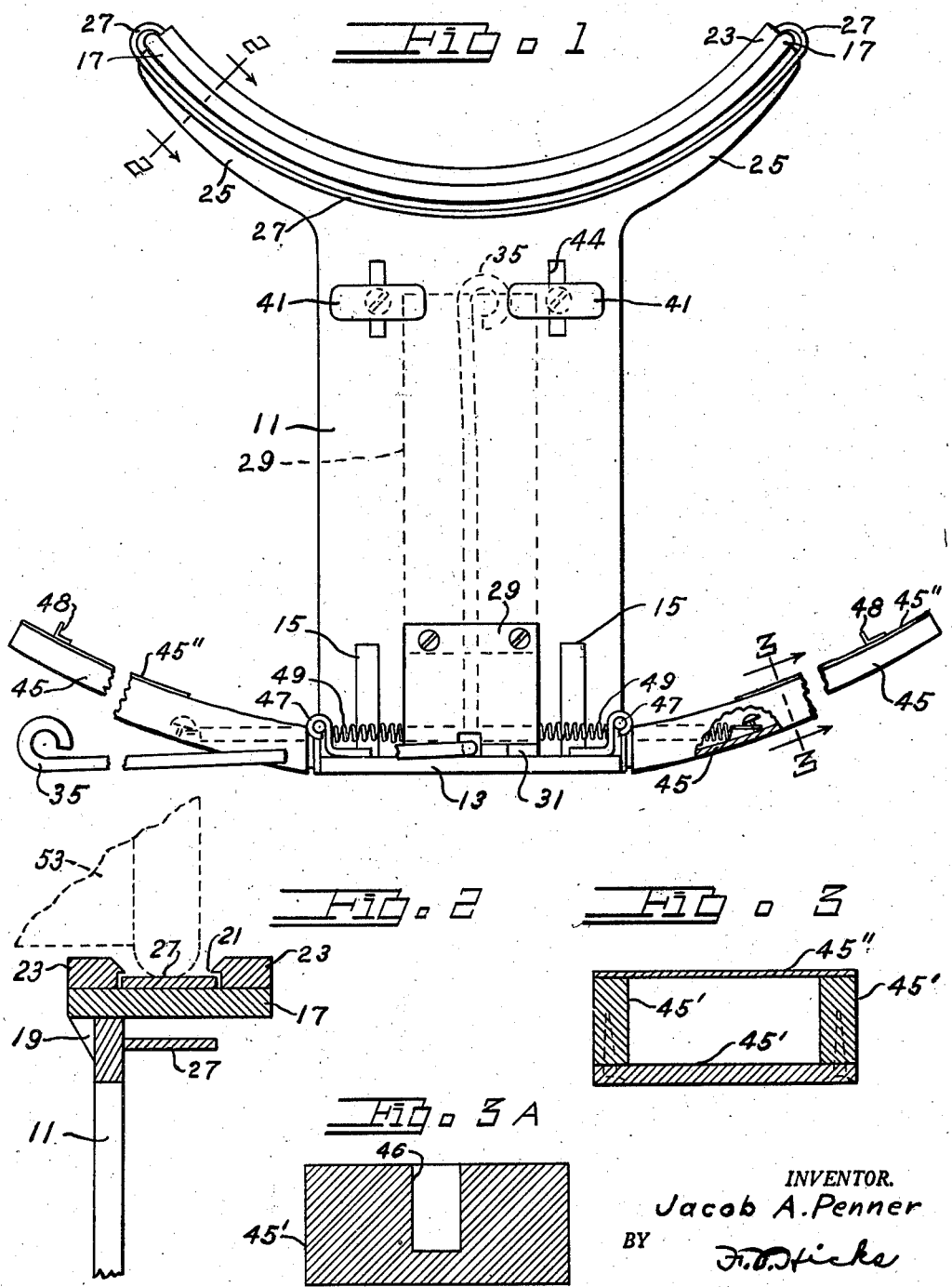
INVENTOR.
Jacob A. Penner
BY
His Attorney May 21, 1946.  J. A. PENNER  2,400,780
JACK
Filed July 29, 1944   2 Sheets-Sheet 2
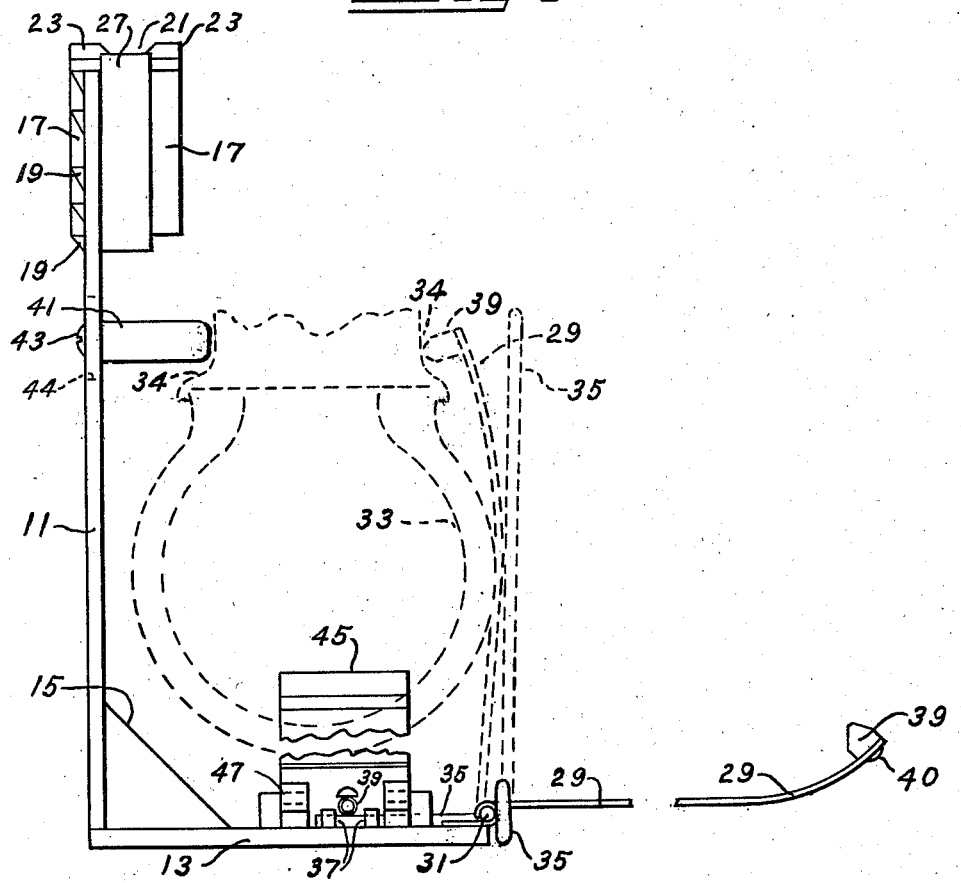
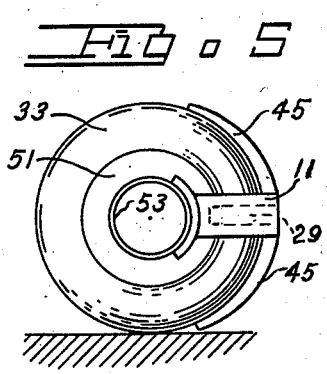
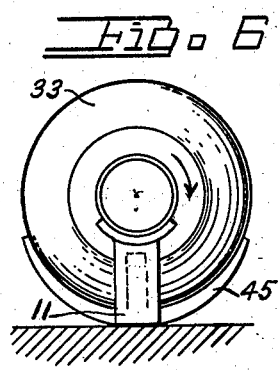
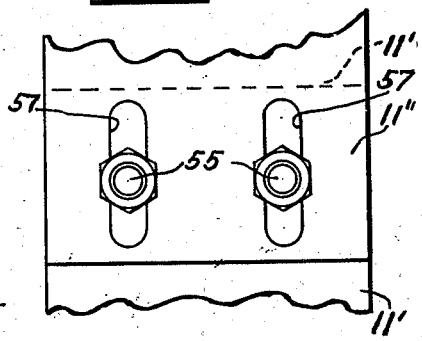
INVENTOR.
Jacob A. Penner
BY
His Attorney Patented May 21, 1946

2,400,780

UNITED STATES PATENT OFFICE 2,400,780

JACK

Jacob A. Penner, Detroit, Mich.

Application July 29, 1944, Serial No. 547,191

5 Claims. (Cl. 254—94)

My invention pertains to self-lifting jacks and more particularly to self-lifting wheel jacks for vehicles.

It is an object of my invention to provide a simple rugged wheel jack which will be conveniently self-lifting for changing wheels on vehicles, and like purposes.

It is also an object of my invention to provide an improved self-lifting wheel jack which is reliable and positive in operation.

It is a further object of my invention to provide a self-lifting wheel jack which may be conveniently installed and removed.

Further objects and advantages are within the scope of the invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of the invention, in which:

Fig. 1 is a side elevational view of the self-lifting jack, showing the outer side thereof;

Fig. 2 is an enlarged sectional view taken on line 2—2 on Fig. 1, a supported brake drum being represented in dotted lines;

Fig. 3 is an enlarged cross sectional view on line 3—3 in Fig. 1, showing the tire gripping arm;

Fig. 3A is a similar view of a modified construction;

Fig. 4 is an edge elevational view of the jack with the adjacent tire tread gripping arm removed, and a tire represented dotted in cross-section;

Fig. 5 is a side elevational view, partially diagrammatic, showing the installation of my self-lifting jack upon the wheel of a vehicle;

Fig. 6 is a similar view showing the wheel run up on the jack; and

Fig. 7 is a fragmentary view of a different embodiment of the vehicle support column made adjustable for height.

Referring more specifically to Figs. 1, 2 and 4, of the drawings, my self-lifting jack comprises a vehicle supporting column 11 having a ground engaging pedestal plate 13 on the lower end for resting upon a suitable area of the ground for support when a vehicle is on the jack. The vehicle support or column 11 is preferably in the form of a rather thin elongated strip or plate, as shown, and it and the pedestal may be of steel or other suitable metal joined, as by welding, and stiffened by means of gusset plates 15. The upper end of the support 11 is cut out along a suitable curve to receive and fit a vehicle brake-drum. A correspondingly curved collar plate 17 is fitted on and secured, as by welding, to the upper curved edge of the vehicle support column and preferably with suitably spaced angles or gussets 19 to provide strength and rigidity. In order to receive the bead on the inner end of a brake-drum, a groove 21 is provided in the upper side of the collar. This is readily accomplished by securing two strips 23 spaced apart on the upper side of the collar plate and along the outer edges thereof. The vehicle support column 11 is preferably provided with laterally spreading flanges 25 extending along and welded under the opposite ends of the collar to provide suitable strength and rigidity. Although a fabricated structure is shown and described, it will be understood that support 11 with its pedestal and collar may be a unitary cast member, if preferred.

The vehicle support column 11 is of such a length that the distance between the brake-drum receiving collar 17 and the ground engaging pedestal 13 is sufficient to support a vehicle wheel above the ground with a fully inflated tire upon the wheel.

To reduce friction when a grit covered brake drum engages into the groove 21 in the collar 17, I preferably provide a free moving member 27 in the groove. Friction reducing member 27 is an endless flexible member passing over the top of the collar plate 17 in the bottom of the groove 21 and returning under it, as shown. For this purpose an endless leather belt is satisfactory, although a suitable chain or other flexible member may be used. Grease, or other suitable lubricant, is placed in the groove under the movable friction reducing member. The shape of the collar 17 and the groove 21 may be selected to suit various types of brake drums to fit thereon, as represented dotted in Fig. 2.

For holding the jack to the inside of the wheel while the vehicle is moved sufficiently to raise it upon the jack, a movable gripping means or clamp 29 is provided which may be pivotally secured, as by a suitable hinge 31 on the outer edge of the pedestal. The clamp 29 is swung out, as shown in full lines in Fig. 4, while the jack is being installed upon a wheel to bring the tire 33 to the position as approximately represented in dotted lines. Thereafter the clamp 29 is turned in toward the wheel rim 34, to the position represented in dotted lines, where it is latched by turning up the latch 35 to its dotted line position. The latch 35 is an L shaped member with the lower end pivotally supported in bearings 37 on the pedestal. The clamp 29 is preferably of sheet metal having resilience suitable for gripping the side of the wheel rim 34, or the tire, and its upper end is provided with a grip 39, which may be attached as by screws 40 passed through the end of the clamp. A pair of abutments 41 are adjustably secured to the support 11, as by screws 43 in vertical slots 44, in a suitable intermediate position and projecting suitably from the outer side for engaging the other side of the wheel rim 34, as shown. These when properly adjusted serve as guides or pilots to hold the jack in a proper relative position to the brake drum and wheel.

For gripping the tread of the tire a pair of clamping arms 45 extend in opposite directions from the opposite edges of the pedestal 13 to which these are pivotally secured by hinges 47. The arms 45 are of any suitable light weight construction, which may be fabricated of curved strips of wood 45' and a metal plate 45", as shown in Fig. 3. The curvature is such as to fit rather closely upon tires of the particular size used, and tread gripping irregularities 48 preferably project from these arms. To more firmly grip the tread of the tire, a tension spring 49 may be provided connecting between the two arms to draw them together, as shown in Fig. 1, the metal 45" terminating to leave open space above the spring. Or, as shown in Fig. 3A, each arm 45 may consist of a solid strip of wood 45' suitably slotted at 46 to receive an end of spring 49. When the jack is not in use, the arms 45 and the clamp 29 may be all folded compactly together toward the column 11. The arms 45 are thin at the outer ends tapering to a greater thickness near the pedestal, as shown.

To use my self-lifting jack, as shown in Fig. 5, (an inside view), it is installed upon a wheel 51 with the upper end or collar engaging the brake-drum 53, and the vehicle support column 11 extending out substantially radially along the inner side of the wheel. The arms 45 grip the tread of the tire 33, and the outside clamp 29, shown dotted, grips the outer side of the wheel rim. This holds the jack on the wheel in a position away from the ground. If wheel 51 is a front wheel, the vehicle is now driven forward a few feet under its own power, to the position as shown in Fig. 6. The first movement rolls the wheel upon and grips the outer end of the arm 45. Continuing rotation then causes the pedestal to engage the ground and brings the vehicle supporting column 11 to a vertical position for raising the car off of the wheel, the lower arm 45 initially rolling under the wheel to aid this operation. The outer clamp 29 is then conveniently and quickly opened and turned down and the car wheel may then be removed and a spare wheel installed. The outer clamp 29 is then again turned up to wheel clamping position and the vehicle is moved backward a few feet sufficiently to turn the jack up, removing the weight of the car, and presenting the jack to a convenient position to be removed, folded up, and put away for future use.

Instead of making individual self-lifting jacks for each different size of wheel and tire, it is possible to provide for universal use by making the car support column 11 adjustable, as shown in Fig. 7. This may be conveniently accomplished by making the car support column 11 adjustable, as shown in Fig. 7. This may be conveniently accomplished by making the column in two sections 11' and 11", made sufficiently long to overlap, and passing a pair of bolts 55 through a pair of holes in one section 11' and through a pair of vertically elongated slots 57 in the other section 11". At the time when the user first purchases his self-lifting jack at the automobile accessory store, he adjusts it properly for his automobile by releasing the bolts and then resetting same for the proper height of the vehicle, and he also adjusts the positions of the abutments 43 to properly engage the side of the wheel rim.

It is apparent that within the scope of my invention modifications and different arrangements may be made other than herein disclosed, and the present disclosure is illustrative merely, the invention comprehending variations thereof.

I claim:

1. In combination in a self-lifting wheel jack, a vehicle support column, a brake-drum engaging collar on one end of said column, said collar being curved to substantially fit a brake-drum, a groove in said collar suitable for fitting along and around the bead on the inner end of a brake-drum, movable friction reducing means in said groove for reducing friction between the brake-drum and the collar, a ground engaging pedestal on the other end of said column, and means for securing said support column along the inside of a vehicle wheel adjacent the brake-drum and away from the ground so that a vehicle may be driven upon it.

2. In a self-lifting jack the combination of: a vehicle support column, a ground engaging pedestal on one end of said column, said pedestal being substantially as wide as a vehicle tire, brake drum engaging means on the other end of said column, said column being of such a length that the distance between the brake-drum engaging means and the pedestal is greater than the distance from the brake-drum to the ground when the tire is inflated, gripping means pivotally secured on and projecting from the outer side of said pedestal for gripping the rim of a wheel to secure said column to the wheel adjacent the brake-drum so the vehicle may be driven up on the jack, and manually operable latching means pivotally mounted on said pedestal for quickly securing or releasing said gripping means.

3. A self-lifting jack in accordance with claim 2 and further characterized by said gripping means being a resilient member.

4. In a self-lifting jack the combination of: a vehicle support, a pedestal on one end of said support presenting suitable surface area for engaging the ground and supporting a vehicle, brake-drum engaging means on the other end of said support, said support being of suitable length for engaging the brake-drum and supporting a vehicle wheel above the ground with the tire inflated, clamping means to hold the support along the inside of a wheel adjacent the brake-drum while the vehicle is driven thereon, a pair of tire tread engaging arms secured to opposite edges of said pedestal and extending in opposite directions for engaging the tread of a tire, tire tread gripping means on each arm, and each of said tire tread engaging arms being thinner at the outer ends tapering thicker near the pedestal to aid in holding the jack as the wheel rolls upon it and to provide an inclined surface to aid in lifting the wheel.

5. In combination in a self-lifting wheel jack, a vehicle support column, a brake-drum engaging collar on one end of said column, said collar being curved suitably to substantially fit around a brake-drum, a groove in said collar suitable for fitting along and around the bead on the inner end of a brake-drum, an endless flexible friction reducing member passing over said collar in said groove for reducing friction between the brake-drum and the collar, said friction reducing member returning under said collar, a ground engaging pedestal on the other end of said column, and means projecting from said pedestal for engaging the outer side of a wheel to secure the support column along the inside of a wheel adjacent the brake-drum so that the vehicle may be driven thereon.

JACOB A. PENNER.